Feb. 17, 1942.  E. S. HINELINE  2,273,355
RANGE FINDER FOR PHOTOGRAPHIC PURPOSES
Original Filed March 15, 1939
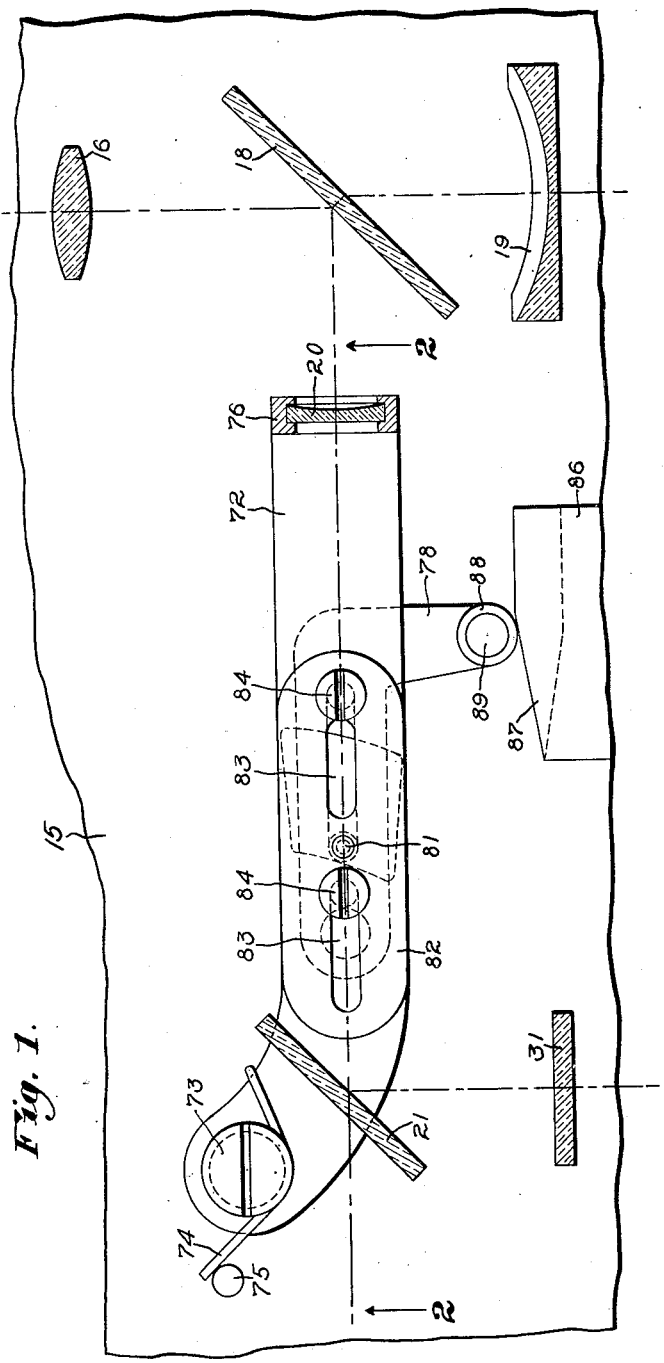
Inventor:
Edson S. Hineline
by Emery, Booth, Townsend, Miller and Davidson
Attys.

Patented Feb. 17, 1942

2,273,355

UNITED STATES PATENT OFFICE 2,273,355

RANGE FINDER FOR PHOTOGRAPHIC PURPOSES

Edson S. Hineline, Rochester, N. Y., assignor to The Folmer Graflex Corporation, Rochester, N. Y., a corporation of Delaware Original application March 15, 1939, Serial No. 262,012. Divided and this application March 6, 1940, Serial No. 322,490

7 Claims. (Cl. 95—44)

This application is a division of my co-pending application Ser. No. 262,012, filed March 15, 1939, now Patent No. 2,215,370, dated September 17, 1940.

The invention relates to range finders for photographic purposes and provides for adjustment at the time of installation or assembly to take care of unintentional variance in lenses as they are manufactured.

In order that the principle of the invention may be readily understood, I have disclosed a single embodiment of the invention in the accompanying drawing, wherein Fig. 1 is a top plan view of the range finder shown as mounted in a housing at the inner face of the top wall of the camera casing; and Fig. 2 is a longitudinal section taken through Fig. 1 on the line 2—2 thereof, showing the means for providing for an adjustment of the range finder tracking mechanism.

The purpose of the present invention is specifically different from that shown in Fig. 2 of my said Patent No. 2,215,370, which provided for a relatively great range of adjustment so as to take care of lenses of intentionally different focal length, as, for example, a lens of four inch focal length or one of eight inches focal length, and which therefore was provided with means whereby the camera operator could easily make the adjustment. The purpose of the present invention, on the contrary, is to provide for adjustment at the time of installation or assembly to take care of unintentional variance in lenses, as they are manufactured and which are classed as of the same focal length.

Without limiting the invention to the embodiment thereof disclosed in the drawing, I will proceed to describe specifically such embodiment.

The optical elements of the range finder itself may be varied. They may, for example, be the same as those disclosed in my Patents Nos. 2,167,435 and 2,167,436, dated July 25, 1939, the applications whereof were co-pending with the application of which this application is a division. Preferably the range finder, whatever the optical elements thereof may be, is built into or onto the camera casing, but within the scope of the invention the controlling means may be used to operate an auxiliary range finder in or on a side or part of the camera casing. Preferably, but not necessarily, the range finder is of a combined range and view finder type.

Without limiting my invention thereto, I have shown the invention as applied to a range finder having two stationary mirrors and an interposed negative lens mounted for swinging adjusting movement, and, since the operation of such a range finder is fully explained in my said patents, it is unnecessary to set forth the same fully herein.

The camera box or casing, the focusing knob, the cam bed tracks, the camera bed-track rails, the camera guide rail screws, the infinity stops, the infinity stop lock screws, the shutter and lens mount, and the focusing scale provided with a focusing scale pointer, may all be such as shown in my said application Ser. No. 262,012, now Patent No. 2,215,370, of which this application is a division, and need not be more fully referred to nor shown. Other parts of the camera structure not herein shown may be the same as shown in my said co-pending application.

The range finder housing is indicated in part in section at 15 in Fig. 2, and is also indicated in Fig. 1. It is secured at the top of the camera, inside the top wall of the camera casing, being a built-in structure. A positive range finder lens is mounted in the wall of the said housing or the wall of the camera casing, as indicated at 16, in a suitable lens mount. A semi-transparent mirror is indicated at 18, a fixed negative lens at 19, and a movable negative lens at 20. An opaque, first surface mirror is indicated at 21, it also being fixedly mounted.

The camera casing or the housing 15 is provided with a glass window 31 through which the image of the object to be photographed is viewed. Thus, a combined range and view finder is provided, the structure of which may be suitably varied within the scope of my invention.

The general structure of the camera front member or assembly may be the same as shown in my said co-pending application of which this application is a division The front of the camera is adjustable vertically and is also adjustable with respect to the tracks, and can be moved forward or back along said tracks by manipulating the front lock.

The camera front can be further adjusted by turning the focusing knob, thereby causing the tracks to be moved forward or backward, carrying the camera front member with them. The infinity stops on the tracks limit the position of the camera front with respect to said tracks by the contacting of the track shoes with the infinity stops. The camera bed is hinged to the camera body by hinges, and is held in position by a side bracket arm, attached to the camera bed by a bracket and held in locked position by a spring.

In order to connect the movable element of the range finder with the camera operating mechanism, and particularly with the supporting or operating means for the camera front member or assembly, I have provided the following means to which, however, my invention is not restricted.

The optical elements hereinbefore referred to are herein used with a camera that has a cam portion on the rearmost part of the lens barrel, for causing the negative lens 20 to be moved across the face of the semi-transparent mirror 18.

In the figures of the drawing, an arm 72 is pivoted on a shoulder screw 73 and is caused to swing forward under the influence of the spring 74 which is anchored against a pin 75. On the arm 72 is carried a lens mounting holder 76 itself carrying the lens 20. In Fig. 2, which is a cross sectional showing through said camera wall or casing, the said arm 72 is shown as attached to the casing 15 of the range finder housing by the shoulder screw 73. The lower portion of the said wall 15 of the range finder housing is provided with a hub 77 and carries a cam follower 78 pivoted on the shoulder screw 79. The cam follower arm 78 has a slot 80 in which a pin 81 is free to travel. The said pin 81 is riveted to an adjusting plate 82 provided with two slots 83, 83 and held to the said arm 72 by shoulder screws 84, 84. The arm or member 72 also has a slot 85, shown in Fig. 2, along which the pin 81 is free to move when the adjusting plate 82 is moved forward or back.

On the lens barrel 86 is a cam 87 and on the cam follower 78 is a roller 88 carried on shoulder rivet 89. The cam follower roller 88 is caused to follow the cam face 87 by the said spring 74 as already stated. If the lens barrel 86 is caused to rotate through 180° for focusing, the cam face 87 is such that the lens 20 will in such case be moved through its proper distance during those 180° of movement, which correspond to a focal adjustment of the lens from three feet to infinity. The range finder lens 20 thus will track with the focusing mount.

Since it is impossible to hold the focal length of lenses to exact limits, the distance traveled by the lens 20 will vary with different lenses whose focal length may vary as much as ⅛", thus providing an adjustment of the adjusting plate 82 carrying the pin 81, and the fulcrum of the cam follower 78 can be adjusted in relation to the fulcrum that the pin 81 provides in the member 72. Thus, whatever the focal length of the lens, and whatever is the distance of travel of the lens barrel 86 (which travels forward and backward at the same time that it turns through 180°), the distance of movement of the lens 20 can be adjusted to compensate for any distance in movement of the lens barrel 86. This provides a ready means for accomplishing the tracking of the range finder with the focal adjustment of the lens. The cam face 87 will vary with the different focal length lenses. That is to say, if a lens is used whose focal length is exactly 50 mm., the movement of the lens barrel 86 forward and back through the operation of focusing will be sufficient to move the lens 20 the necessary distance for range finder tracking. If, however, a 35 mm. lens be used a cam with a receding face should be attached to the end of lens barrel 86. It will be understood that the movement in focusing a 35 mm. lens would not be sufficient to move the lens 20 of Fig. 1 through a sufficient range to cover the distances of three feet to infinity. Therefore, an additional movement is necessary, and this is provided as will be explained. When the lens barrel 86 is rotated to focus the lens, the roller 88 will follow the end of the lens barrel. Since this distance is less than that distance required to move lens 20 sufficiently, the receding portion of cam face 87 must be added to the movement of the lens when focusing. If, for instance, a lens of 75 mm. were to be used, the movement of barrel 86 would be too great for that movement of lens 20 which in that case would travel too far. Therefore, a raised cam face 87 will be added to lens barrel 86 and the said raise of cam face 87 will be subtracted from the movement of lens barrel 86 in focusing, thereby moving roller 88 a sufficient distance properly to move lens 20 the required distance for the range of three feet to infinity.

In accordance with my invention, in order to carry out my purpose of permanently adjusting the parts to provide for slight actual variances in lenses classed as of the same focal length, I provide means for transferring a lineal motion to a pivoted arm with means for varying the ratio of the movement of the cam follower and the movement of the negative lens carrying member.

The reason behind and the purpose of this structure is that no two lenses, even if they are specified as of equal focal length, are exactly the same in that respect. One may be minus a rather small dimension, such as .0050" with respect to the true focal length, or it may be plus .0050" with respect thereto. This change will mean that the total travel of cam follower roller 88 will be a different distance with such lenses under the same condition of picture taking (i. e. a shorter distance with a lens which is to the negative side of the proper dimension, but a greater distance with a lens on the positive side of the proper dimension). Yet negative lens 20 always has to move exactly the same distance when the lens is moved to correspond to given distances, as, for instance, three feet to infinity.

Therefore, it is necessary to vary or modify the movement of roller 88 so that negative lens 20 always travels precisely the same amount when the lens is moved throughout its range, as previously stated. It will be seen that the ratio of the movement of cam follower arm 78 with relation to lens arm 72 will depend upon the position of pin 81 in slot 80 of the said cam follower arm 78 with respect to the pivot 79 of said cam follower arm 78.

This structure is for a specifically different purpose than the structure shown in Fig. 2 of my said co-pending application Ser. No. 262,012 now Patent No. 2,215,370, (through presenting the same generic idea of adjusting the range of movement of an element of an optical group of a range finder, such as a negative lens between two mirrors), in that the structure shown in said Fig. 2 of said co-pending application, is to provide a greater range of adjustment, so as to take care of lenses of intentionally different focal length (as, for example, a lens of four inches focal length, or one of eight inches focal length), and has means whereby the camera operator can readily make this adjustment. The mechanism shown in the drawing of this divisional application is only adjusted at the time of installation or assembly to take care of unintentional variance in lenses as they are manufactured, and this ratio of adjustment is relatively small.

Having thus described one illustrative embodiment of the invention, it is to be understood that although specific terms are employed, they

I claim:

1. Focusing mechanism for focusing in a combined view and range finder the position of the lens of a camera so that it shall focus on the plate or film of the camera, objects at varying distances from the objective lens thereof, and having means adapted and arranged only for permanently setting the parts to provide for slight actual variances in lenses classed as of the same focal length, comprising, in combination; a camera casing having a movable objective lens, said lens having a rotatable lens barrel with a cam face; a combined view and range finder attached to the camera casing and provided with two fixed mirrors and an intermediate negative lens; a positive range finder lens at one side and a fixed negative lens at the opposite side of one of said mirrors, and a glass window at one side of the other mirror for two spaced light beams; a pivoted member within said camera casing adjacent an outer wall thereof, and whereon said negative lens is mounted for transverse movement with respect to a right line through said mirrors; and a cam follower arm or member directly engaging said cam face on the objective lens barrel and mounted upon the said outer wall of said casing, for directly engaging said objective lens barrel and having an operating, adjustment-providing connection extending through said wall of the casing and engaging, for the adjustment thereof, said pivoted member that carries the negative lens; and means adapted and arranged only for adjustably setting in permanent position said cam follower arm or member, and acting through said adjustment-providing connection, so to secure in use precisely the same amount of movement of the negative lens arm or member as would occur with a precisely accurate lens of the same classification as to focal length, in taking the same picture.

2. Focusing mechanism for focusing in a combined view and range finder the position of the lens of a camera so that it shall focus, on the plate or film of the camera, objects at varying distances from the objective lens thereof, and having means adapted and arranged only for permanently setting the parts to provide for slight actual variances in lenses classed as of the same focal length, comprising, in combination; a camera casing having a movable objective lens, said lens having a rotatable lens barrel with a cam face; a combined view and range finder attached to the camera casing and provided with two fixed mirrors and in intermediate negative lens; a positive range finder lens at one side and a fixed negative lens at the opposite side of one of said mirrors, and a glass window at one side of the other mirror for two spaced light beams; a pivoted member within said camera casing adjacent an outer wall thereof, and whereon said negative lens is mounted for transverse movement with respect to a right line through said mirrors; a cam follower arm directly engaging the cam face of the objective lens, said arm being pivotally mounted upon said outer wall of the casing at the other face thereof from that at which said pivoted member is mounted; a connection between said cam follower arm and said negative lens pivoted member, extending through said wall of the casing, and means acting through and cooperating with said connection for varying the position of said pivoted member, and thereby permanently setting the range finder parts, whereby the same movements of the negative lens pivoted member may be secured under the same conditions notwithstanding slight unintentional variations in the focal length of lenses.

3. Focusing mechanism for focusing in a combined view and range finder the position of the lens of a camera so that it shall focus, on the plate or film of the camera, objects at varying distances from the objective lens thereof, and having means adapted and arranged only for permanently setting the parts to provide for slight actual variances in lenses classed as of the same focal length, comprising, in combination; a camera casing having a movable objective lens, said lens having a rotatable lens barrel with a cam face; a combined view and range finder attached to the camera casing and provided with an optical group one member of which is adapted to be moved in focusing with respect to the others of said group; said group including two mirrors, a positive range finder lens at one side and a fixed negative lens at the opposite side of one of said mirrors, and a glass window at one side of the other mirror for two spaced light beams; a pivoted member mounted upon a wall of the camera casing and whereon said movable optical member is mounted, and a cam follower arm or member mounted on the opposite side of said camera casing wall from said pivoted member, and engaging said cam face on the objective lens barrel and having an operative connection with said pivoted member; and means extending through said wall of the camera casing to said pivoted member for adjustably setting in permanent position said cam follower arm or member so as to secure in use precisely the same amount of movement of the movable member of the optical group as would occur with a precisely accurate lens of the same classification as to focal length in taking the same picture.

4. A photographic camera including a camera casing having a movable support for the objective lens thereof; a combined view and range finder and housing therefor built into the camera casing and extending transversely of the top wall of the said camera casing; a semi-transparent mirror and a first-surface mirror both stationarily mounted in said housing at opposite end parts thereof and cooperating viewing elements adjacent said mirrors respectively; a negative lens within said housing between said mirrors; a lever within said housing whereon said negative lens is mounted for movement transverse to a right line through said mirrors; a pivoted arm mounted upon one face of a fixed wall of the camera and means for permanently setting the parts to provide for slight actual variances in lenses classed as of the same focal length including a lengthwise extending slot in said pivoted arm, a controlling part mounted upon the opposite face of said camera wall and having a manual-adjustment portion extending through said camera wall and received in said slot, said portion being directly accessible to the operator for manual adjustment thereof by him along said slot to a permanent setting position, so that in accordance with its different positions of such adjustment along said slot, it accords with the actual focal length of the objective lens, and therefore a different movement is in consequence imparted to said negative lens lever, in photographing under the same conditions with lenses having slight actual variances, though classed as of the same focal length.

5. Focusing mechanism for determining the position of the lens of a camera so that it shall focus, on the plate or film of the camera, objects at varying distances from the objective lens thereof, and having means for permanently setting the parts to provide for slight actual variances in lenses classed as of the same focal length, comprising, in combination; a camera casing having a movable objective lens, said lens having a rotatable barrel with a cam face; a combined view and range finder attached to the camera casing and provided with two fixed mirrors and an intermediate negative lens; a pivoted member whereon said negative lens is mounted for transverse movement with respect to a right line through said mirrors; a cam follower arm engaging the objective lens face cam, said cam follower arm being pivoted upon the camera casing and having a slot 80 extending lengthwise thereof; said negative-lens pivoted-member having an adjusting plate 82 applied flatwise thereto, said plate having a lengthwise extending slot, means located in said slot and connected to said pivoted member, and providing for the lengthwise adjustment of said plate, the latter also having a projection 81 extending into the slot 80 of the cam follower arm and movable therealong by adjusting movement of said plate 82, thereby varying the fulcrum of the cam follower in relation to the fulcrum that the said projection 81 provides in the said negative-lens pivoted-member.

6. Focusing mechanism for determining the position of the lens of a camera so that it shall focus, on the plate or film of the camera, objects at varying distances from the objective lens thereof, and having means for permanently setting the parts to provide for slight actual variances in lenses classed as of the same focal length, comprising, in combination; a camera casing having a movable objective lens, said lens having a rotatable barrel with a cam face; a combined view and range finder attached to the camera casing and provided with two fixed mirrors and an intermediate lens; a pivoted member whereon said lens is mounted for transverse movement with respect to a right line through said mirrors; a cam follower arm engaging the objective lens face cam, said cam follower arm being pivoted upon the camera casing and having a slot 80 extending lengthwise thereof; said lens-pivoted member having an adjusting plate 82 applied flatwise thereto, said plate having a lengthwise extending slot means located in said slot and connected to said pivoted member, and providing for the lengthwise adjustment of said plate, the latter also having a projection 81 extending into the slot 80 of the cam follower arm and movable therealong by adjusting movement of said plate 82, thereby varying the fulcrum of the cam follower in relation to the fulcrum that the said projection 81 provides in the said lens-pivoted member.

7. A photographic camera including a camera casing having a movable support for the objective lens thereof; a combined view and range finder and housing therefor built into the camera casing and extending transversely of the top wall of the said camera casing; a semi-transparent mirror and a first-surface mirror both stationarily mounted in said housing at opposite end parts thereof and cooperating viewing elements adjacent said mirrors respectively; a negative lens within said housing between said mirrors; a lever within said housing whereon said negative lens is mounted for movement transverse to a right line through said mirrors; a pivoted arm mounted upon a fixed portion of the camera and means for permanently setting the parts to provide for slight actual variances in the lenses classed as of the same focal length including a lengthwise extending slot in said pivoted arm, a controlling part mounted on said lever having a manual-adjustment portion received in said slot, said portion being directly accessible to the operator for manual adjustment thereof by him along said slot, so that in accordance with its different positions of such adjustment along said slot to compensate for focal length differences, a different movement is in consequence imparted to said negative lens lever, in photographing under the same conditions with different objective lenses.

EDSON S. HINELINE.